April 6, 1926. 1,579,663
F. SCHLATTERER
TENON MILLING MACHINE
Filed Oct. 27, 1925 2 Sheets-Sheet 1
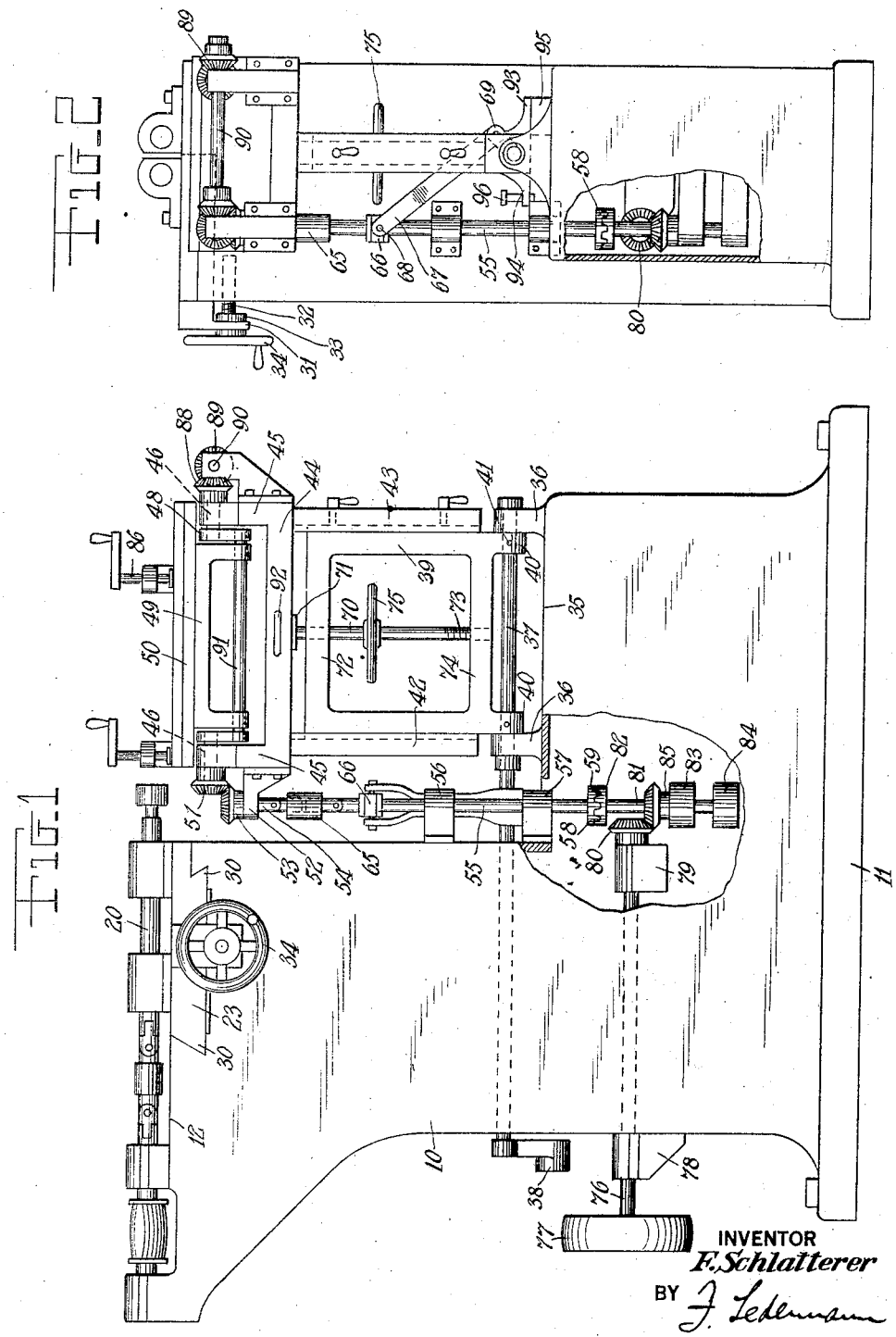
INVENTOR
F. Schlatterer
BY
ATTORNEY

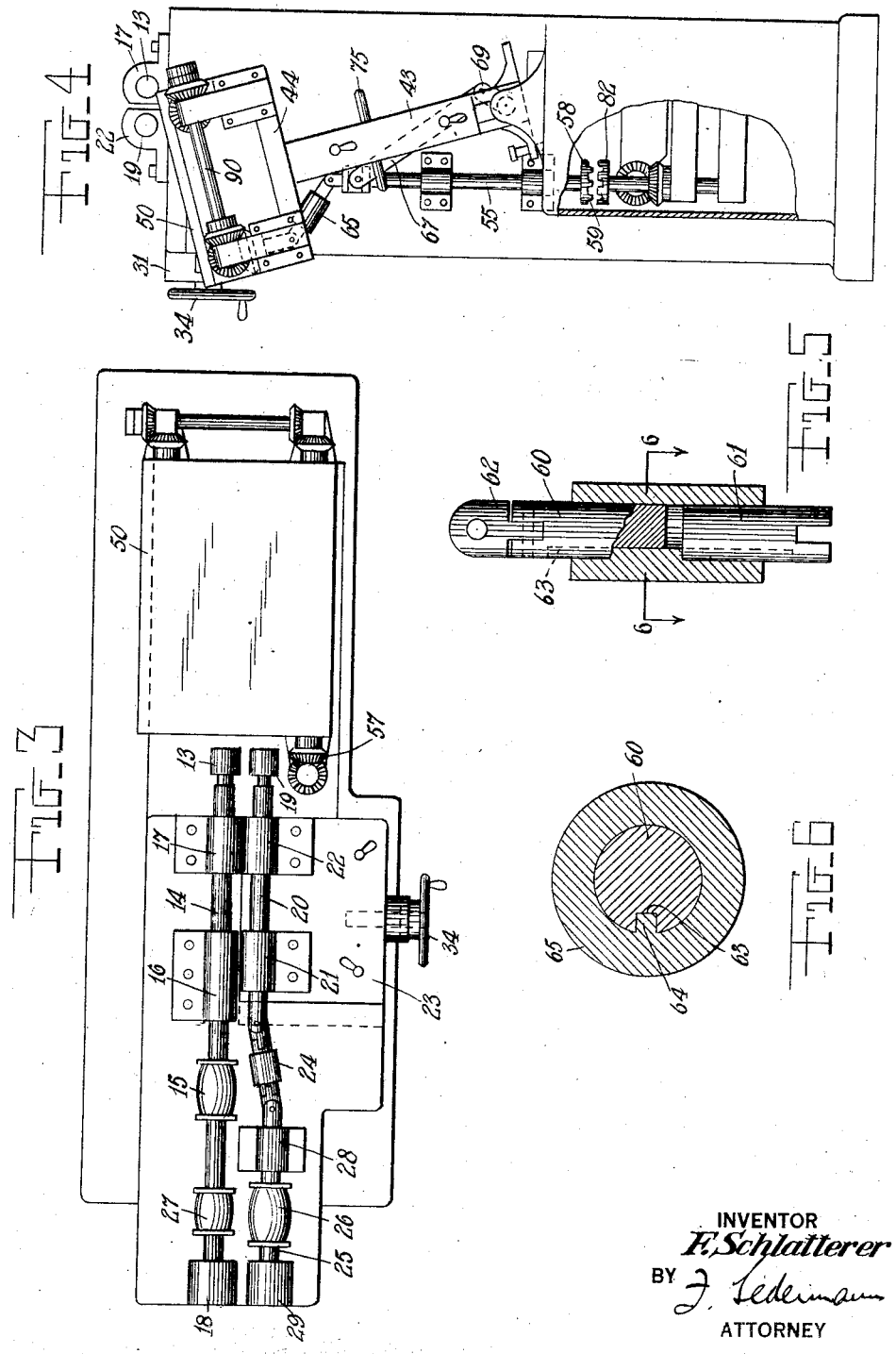

Patented Apr. 6, 1926.

1,579,663

UNITED STATES PATENT OFFICE.

FRED SCHLATTERER, OF NEW YORK, N. Y.

TENON-MILLING MACHINE.

Application filed October 27, 1925. Serial No. 65,066.

*To all whom it may concern:*

Be it known that I, FRED SCHLATTERER, a citizen of Germany, residing at New York, in the county of New York and State of New York, have invented certain new and useful Improvements in Tenon-Milling Machines, of which the following is a specification.

The embodied specification is a co-pending application relating to a previous application, Serial No. 49,518, filed August 11, 1925; in which latter application, the table used on the present device and the method of moving the same in a circular path has been described and claimed.

The main object of this invention is to provide a machine for forming circular tenons on the end of longitudinal pieces of material. These longitudinal pieces of material are placed on the machine side by side and rotating gang cutters form the tenons on the ends thereof. One of the main features of the invention is a table describing the circular movement by being mounted upon eccentric bars which are actuated by a power mechanism and swing the ends of the longitudinal pieces of material around rotating cutters to form the tenons.

Another purpose of the invention is to provide an embodied mechanism whereby the tenon support table is shifted angularly and displaced so that the formed tenons may be removed and new tenon pieces inserted in place in a convenient manner and in a position away from the cutters.

Still another object is to provide a tenon milling machine having rotating gang cutters, a tiltable tenon piece supporting table which lies in a horizontal plane when the cutters are performing their work, said table being tilted to an angular position when tenon pieces are to be inserted and removed, and a clutch mechanism which automatically and simultaneously disengages the tenon table rotating mechanism when said tenon table is manually tilted.

The above and other objects will become apparent in the description below, in which characters of reference refer to like-named parts in the drawing.

Referring briefly to the drawing, Figure 1 is a side elevational view of the complete tenon forming mechanism.

Figure 2 is an end elevational view of Figure 1, showing the position of the tenon support table when in operative position.

Figure 3 is a top plan view of Figure 1.

Figure 4 is a view similar to Figure 2, showing the tenon support table in tilted position and illustrates the means of disconnecting the table actuating mechanism.

Figure 5 is a longitudinal sectional elevational view of the method of the construction used in providing an extensible shaft used on the mechanism.

Figure 6 is a cross sectional view taken on lines 6—6 of Figure 5.

Referring in detail to the drawing, the numeral 10 indicates the hollow body of the machine and forms the base upon which the entire mechanism for forming a plurality of tenons simultaneously, is supported. This base or body is of a height convenient for manipulation of the various parts on the machine and is provided with a flanged lower portion 11 thru which bolts or other securing means pass for fixing the machine in place in rigid and immovable position. The body has a pair of flat surfaces, one above the other, and mutually adjacent, the upper surface 12 of which supports the entire cutter mechanism, the cutters being illustrated and described in detail in the copending application, Serial No. 49,518. The preferable arrangement for the cutter mechanism is to employ a pair or two which are aligned parallel to each other and rotate simultaneously and in the same direction, clockwise or counter-clockwise, as desired. One of the cutters 13 is mounted on the end of a longitudinal straight spindle 14 which is rotated by means of a belt trained about a pulley 15. The spindle 14 is supported in fixed position in bearing blocks 16 and 17 and an end bearing block 18. An additional cutter 19 is provided which is aligned with the cutter 13 and is removably mounted in the end of an additional spindle 20. This additional spindle is composed of three sections, one section, indicated by the numeral 20, to which the cutter 19 is attached, is rotatably mounted in bearing blocks 21 and 22 which are bolted upon the surface of a transversely adjustable carriage 23, the bearing blocks being bolted in place thereon. From the rear end of the spindle section 20, an additional length of shafting 24 is provided which joins the section 20 to a rear length of spindle 25 on which latter, a pulley 26 is mounted. The intermediate section of the shafting 24 connects the end sections of the spindle 20 and 25 thru means of universal joints, the most elementary form of which is shown in Figure 3. The rear end section 25 of the spindle on which the pulley 26 is mounted, is rotated by an endless belt which is trained about said pulley 26 and an additional pulley 27 mounted on the rear end of the spindle 14. This rear end section of spindle 25 is fixedly mounted in bearing blocks 28 and 29 and transmits rotation to the forward section 20 of the spindle thru the medium of the intermediate section of shafting 24. The bearing blocks 21 and 22, in which the front section 20 of the spindle is journalled, are movable transversely thru adjustment of the carriage 23. This carriage has inclined corners 30 which dovetail into and are slidable in channels formed in the base 10 on the upper level 12 thereon. The means of adjusting this carriage transversely across the surface 12 to move the spindle section 20 comprises a downwardly extending ear 31 which is bolted securely to the side of the carriage and is provided with an opening in which a threaded bolt 32 is rotatable, said bolt being freely rotatable in the opening. This threaded bolt engages a threaded hole formed in the base 10 beneath the carriage 23 and is prevented from moving longitudinally in the ear 31 by collars 33. The outer end of the threaded bolt projects somewhat from the ear 31 and has a hand wheel 34 secured thereon thru which hand wheel the bolt is adapted to be rotated when adjusting the position of the carriage in the channels formed in the base.

The lower level 35 of the base supports the entire table structure and table tilting means. The table tilting means comprises essentially a pair of aligned lugs 36 thru which a king bolt 37 passes. This king bolt extends entirely the length of the body or base of the machine and projects from one end of the same, having at this projecting end a weighted arm 38 secured thereto, the weighted arm being adapted to normally rotate said king bolt in a clockwise direction. A rectangular guide frame having parallel sides 39 is supported on this king bolt and its construction requires the provision of a pair of downwardly projecting extensions 40 at its lower corners in which openings are provided for the passage of the king bolt 37. Pins 41, or other means, secure the guide frame rigidly upon the king bolt. The sides 39 of the frame form guideways whose edges enter into longitudinal channels of a pair of arms 42 and 43 mounted on opposite sides of the guide frame and form downwardly extending portions of a flat bed plate 44. The bed plate 44 has a leg 45 extending upwardly from each of its four corners and in each leg, a stud 46 is rotatable. To the inner ends of these studs, eccentric bars 48 are secured. The eccentric bars 48, bracket 49, circularly moving table 50, and all the elements which relate to the movement of this circularly moving table, are identical to the structure illustrated and described by the numerals 11, 14, 17, and the studs 18 of applicant's co-pending application, Serial No. 49,518, and function in the same manner.

The improvement over the co-pending application lies in the method of actuating this circularly moving table 50 and comprises a bevel gear 51 which is securely fixed to a projecting end of one of the studs 46. As two of these studs already have gears mounted thereon, which gears accomplish the circular movement of the table 50, the remaining two studs are available for the purpose of attaching actuating means, it being necessary to use only one of these available studs to accomplish the purpose. Below the stud to which the bevel gear 51 is attached, a bearing block 52 is provided for the support of an additional bevel gear 53 which is mounted on the upper end of a short section of shafting 54, the latter being journalled in the bearing bracket and extending vertically downward. Below the section of shafting 54 and aligned axially therewith is a vertical drive shaft 55 in which is journalled a pair of bearings 56 and 57 and has at its lower end a hub 58 provided with radial teeth 59. These two sections of shafting 54 and 55 are connected by a pair of intermediate shaft sections 60 and 61, member 61 being connected thru a universal joint 62 to the shaft 55, and the upper member 60 being connected in the same manner thru a universal joint 62 to the short section of shafting 54. The intermediate shaft sections 60 and 61 are intermediate of each other, both being provided with key slots 63 in which a longitudinal key 64, forming part of a locking sleeve 65, is slidable. The locking sleeve 65 is provided for the purpose of permitting extensibility of the shaft sections 60 and 61 which are adapted to rotate during elongation of the sections. Near the upper end of the section 55, of the vertical drive shaft, a pair of integral flanges are provided which are mutually spaced-apart and between which, a sleeve 66 is loosely mounted on said shaft. A bifurcated lever 67 is pivotally secured at diametrically opposite positions on the sleeve by pivot pins 68. The lever 67 extends angularly downward when the plate 44 is in true horizontal position and has its lower end pivotally joined to a relatively short link 69, the opposite end of the link being rigidly connected to the king bolt 37 intermediate its length, the latter being adapted to rotate in a counter-clockwise direction when member 44 is tilted from the true horizontal position, shown in Figure 2, to an angular position, shown in Figure 4.

To adjust the bed plate 44 vertically into closer proximity to the cutters, or to lower the same away therefrom, an adjustment is provided. This adjustment comprises a rod 70, circular in cross section, which is rotatably mounted in the horizontal portions of the guide frame and has the upper end contacting with a head plate 71. Below the head plate, the rod is rotatably journalled in an opening formed in the upper horizontal connecting arm 72 of the vertical guide frame and the lower threaded end 73 of the rod enters into and is engaged in a threaded hole formed in the lower connecting bar 74 of the vertical guide frame. Intermediate the length of the rod 70, a hand wheel 75 is fixed thereon, which when manipulated, causes the rod to rotate and be longitudinally lifted or lowered by engaging the threaded hole in the lower connecting arm 74 of the vertical guide frame and thru contact with the head plate 71, causes the bed plate 44 and the entire mechanism supported thereon to be lifted.

The mechanism for driving the vertical shaft 55 is positioned at the lower end of the body 10 and comprises a driven shaft 76 which extends in a horizontal direction and projects from the side of the body 10, to which projecting end, a pulley 77 is secured, said pulley being connected to some rotating source of power by means of an endless belt, or the like. The driven shaft 76 is journalled in bearings 78 and 79, and at the end opposite to the pulley, has a bevel gear 80 fixed thereto. Axially aligned with the vertical drive shaft 55, is a second short length of shafting 81 which is placed end to end adjacent the lower end of the vertical drive shaft 55 and has a toothed hub 82 at its upper end whose teeth cooperate with the teeth 59 of the hub 58, forming part of the vertical drive shaft 55, and when interlocked, both shafts rotate in unison. The shaft 81 is journalled in bearings 83 and 84, and at a position intermediate its length below the hub 82, a bevel gear 85 is fixed thereto which lies in constant mesh with the bevel gear 80 fixed on the end of the driven shaft 76.

The machine is particularly adapted to form circular tenons in ends of square or other shaped articles formed of material such as wood, or the like. One of the essential characteristics of the machine is its method of tilting the table upon which the tenons are anchored by suitable clamps when said tenon pieces having been completely finished so that the pieces may be removed from the table 50 at a convenient position clear of the cutters 13 and 19 so that the same will not do injury to the work. Another characteristic of the machine is that as the table 50 is being tilted to the inoperative position, in which the tenon pieces are removed from the machine, the mechanism which causes this table to move in a circular path is disarranged and rendered inoperative by the mechanism itself, that is, the rotating means which cause the table to move in a circular path, is stopped and rendered inoperative until the table 50 has again been tilted to its true horizontal and normal operating position.

The structure essential for moving the table 50 upon which the pieces to be tenoned are clamped by clamp screws 86, which are threadably mounted in clamp blocks 87, has been illustrated and described in the co-pending application, Serial No. 49,518, and consists briefly of mounting this table upon members which are pivotally supported at the free ends of eccentric bars 48, one eccentric bar at each corner of the table, the four to move in unison and swing the table in a circular path. Two of these eccentric bars, shown in the co-pending application, have bevel gears 88 mounted thereon which are driven by additional bevel gears 89 mounted on a driving shaft 90. On this machine, however, the shaft 90, which in the co-pending application is actuated by a hand wheel, or the like, and forms the drive shaft for the mechanism, in this case merely serves as a means of connecting the studs 46 of adjacent eccentric bars 48. On the opposite side of the table, at opposing corners, eccentric bars are also provided on the there positioned studs 46, and one of these studs is of a suitable length so as to project from the side of the leg 45 for the purpose of attaching the bevel gear 51 thereto. This bevel gear, when rotated, being adapted to move its eccentric bar in a circular path and as its eccentric bar is fixedly connected to the eccentric bar at the opposite corner by a length of shaft 91, the opposite eccentric bar will also be moved in a circular path, this opposite eccentric bar being mounted on a stud 46 to which the gear 88 is attached, will transmit this rotating motion to the remaining two eccentric bars at the opposing corners beneath the table 50 thru the medium of the shaft 90 and gears 89. The bevel gear 51, which swings all the eccentric bars thru the means of the gearing and shafting employed, lies in mesh with an additional bevel gear 53 which is mounted upon the upper end of a short section of shafting 54, the latter having a universal joint at its lower end. This shaft 54 is coupled by intermediate sections to a vertical drive shaft 55 at the lower end of which a toothed hub 58 is provided. The toothed hub cooperates with another similar member 82 fixed on the upper end of a shaft 81, said shaft 81 being driven by a pulley actuated horizontal shaft 76 thru the medium of meshed gears 80 on the driven shaft 76, and a gear 85 on the shaft 81.

The main purpose, that of tilting the table when it is desired to remove the tenon pieces from place on the table and position new tenon pieces, and at the same time stop rotation of the vertical drive shaft 55 and stop the swinging of the table 50 in a circular path, is accomplished by disengaging the toothed hub 58 from the similar hub 82 by moving the former upwardly, this operation being performed automatically by swinging the table. The machine worker may tilt the table to an angle of 15 degrees by grasping a handle such as 92 and swinging the entire mechanism supported on the vertical guide frame toward himself or toward the left side of the machine, as illustrated in Figure 4. In pulling the bed plate 44, to which the handle 92 is attached, toward the left side of the machine, the entire vertical guide frame and all the mechanism supported thereon, including the circularly moving tenon table 50, is tilted to a corresponding degree to make this tilting operation easy to perform. The king bolt, which is firmly secured to the vertical guide frame by pins 41, has a weighted arm 38 which in a measure counter-balances the mechanism supported on the vertical guide frame and thru this means, swinging or tilting of the mechanism on the vertical guide frame is more easily effected. As the bed plate 44 and the tenon table 50 are tilted from the true horizontal position, shown in Figure 2, to the angular position, shown in Figure 4, the king bolt 37 to which the weighted arm 38 is attached, is swung a corresponding degree of arc, in this case, approximately 15 degrees, as said king bolt is connected rigidly by pins 42 to the vertical arms 39 of the vertical guide frame. The king bolt 37 has at a position intermediate its length a link 69 attached thereto, and this link in rotating with the king bolt 37, swings upwardly. This upward swing of the link is transmitted to the bifurcated lever 67, which being pivotally connected to the sleeve 66, rotatably fixed on the vertical drive shaft 55 at a position near its upper end, lifts the driven shaft upwardly and uncouples or disengages the toothed hub 58 from the hub 82, and in this manner, stopping rotation of the vertical drive shaft while the driven shaft 66 remains rotating. The disengagement of the hub 58 from the hub 82 is accomplished during the swing of the bed plate 44 and vertical guide frame and is completed when these members arrive at the end or complete the swing of approximately 15 degrees. When the bed plate 44 and the mechanism supported thereon is in true horizontal position, the shaft sections 54, 60, 61, and 55, are all axially aligned, but as said bed plate is tilted, the drive shaft 55 remains in its true position while a short length of shaft 54 journals in the bearing which is mounted on the side of the bed plate 44, which plate is shifted to an angular position with respect to the vertical drive shaft 55 and the connecting shaft sections 60 and 61 join the shaft sections 54 and 55 at still another angle. The distance between these shafts 54 and 55 is reduced as the bed plate passes from the true horizontal position to the angular position, and in order to permit shortening of this distance, the intervening section of shafting is composed of two separate and distinct shaft sections 60 and 61, both of which are provided with keyways 63, in which the key 64 of an encircling sleeve 65, fits. As the bed plate 44 is tilted, the shaft section 54 and the vertical drive shaft 55 come into closer proximity to each other, which difference is compensated for by permitting the keyed sections of the shaft members 60 and 61, to move toward each other within the sleeve 65. From this description, it will be seen that such mechanism supported on the vertical guide frame, including the bed plate 44 and tenon table 50, is tilted from the horizontal to an angular position, the king bolt 37 is rotated a distance corresponding to the swing of the guide frame, and the link is rotated, lifting the bifurcated lever 67 so that the driven shaft 55 is lifted in order to disengage the toothed hub 58 on said vertical drive shaft from the toothed hub 82 on the shaft 81, which latter is being constantly rotated by the driven shaft 76.

In order to permit adjustment of the distances between the surface of the tenon table 50 and the axis of the cutters 13 and 19 in the vertical plane, the bed plate 44 and all the mechanism thereon may be lifted or lowered vertically thru means of the threaded rods 70 whose lower threaded end 73 is engaged in a threaded hole formed in member 74 of the vertical guide frame and thru engagement in this hole, when rotated, either lifts or lowers the bed plate 44 and the mechanism supported thereon and in this manner, lengthens or shortens the distance between the axis of the cutters and the surface of the tenon table 50. In order to make this adjustment, the vertical drive shaft, or the sections coupled thereto, must be capable of being elongated or shortened and to compensate for such an elongation or shortening, the sleeve 65 is used, as said sleeve locks both sections 60 and 61 so that they rotate in unison for the purpose of transmitting rotation from the vertical driven shaft 55 to the shaft 54. One of the lugs 40, forming part of the vertical guide frame has a pair of ears 93 and 94 extending from opposite sides and in opposite directions from each other. Beneath the ear 93 and integral with the body 10 of the machine, is a flat block 95 having a horizontal surface thereon upon which the ear 93 normally sits when the vertical guide frame is in horizontal position. The opposite ear 94 has a locking bolt 96 threadably engaged therein which may be adjusted and its lower end adapted to contact with and be supported on the surface 35 of the body when the vertical guide frame is in angular position. The cooperating of these parts 93, 94, 95 and 96, provide an adjustment and stop for the range of swing of the vertical guide frame and the mechanism it supports.

Another essential characteristic of the machine is that more than one tenon piece may be formed upon the machine simultaneously. For the purpose of clarity, a single unit or a pair of cutters are shown, but these units may be duplicated side by side adjacent one edge of the tenon table when multiplication of tenon pieces is desired. The cutter unit, illustrated, consists of a pair of cutters, one of which is mounted upon a straight horizontal spindle 14 in bearing blocks 16 and is rotated by being connected to a source of power thru an endless belt being trained about the pulley 15. The remaining cutter 19 rotates parallel to the cutter 13 and adjacent thereto upon a separate and distinct spindle which is divided into three sections, 20, 25, and an intermediate connecting section 24. The intermediate section of shaft is identical to that construction shown in Figures 5 and 6, consisting of two sections of shaft provided with keyways on which a keyed sleeve is slidable, the keyed sleeve being adapted to permit elongation or shortening of the length of shaft sections joining spindle sections 20 and 25. By training a belt around the pulleys 26 and 27, both spindles upon which the cutters 13 and 19 are mounted, are simultaneously rotated. To permit horizontal adjustment of the distance between the axes of the cutters 13 and 19 so that tenons of greater or lesser diameter may be formed, the spindle section 20 is mounted upon an adjustable carriage so that the distance between the axes of the fixed spindle 14 and the movable spindle 20 may be varied or moved apart, or mutually closer to each other. This construction comprises two bearing blocks 21 and 22 which are fixedly mounted upon a dove-tailed carriage 23 capable of being transversely moved across the body of the machine and means for moving the carriage. The rear portion or section of spindle 25 is fixed upon the body of the machine and cannot be moved from its position. By rotating the hand wheel 34, the threaded screw 32 is fed into and out of a threaded hole formed in the side of the body 10 below the carriage 23 and being anchored to said carriage, causes adjustment of the latter, which movement adjusts the distance between the axes of the cutters 13 and 19.

I claim:—

1. A tenon forming machine comprising a base having two surfaces, one above the other, said surfaces being mutually adjacent, a pair of spindles mounted on the upper surface, means for varying the distance between said spindles in a horizontal plane, cutters on said spindles, means for swinging tenon pieces around the periphery of the cutters comprising a table, a bed plate below said table, means supported on said bed plate for moving said table in a circular path around the axes of said cutters, means for tilting said table and bed plate, means for driving said table in a circular path, and means for disengaging the driving means simultaneously with the tilting of the table.

2. A tenon forming machine comprising a base having an upper and lower surface thereon, a pair of axially adjacent spindles mounted on the upper surface, means for varying the distance between the axes of said spindles, means for swinging the tenon pieces around the peripheries of said cutters comprising a table, a bed plate supporting said table, studs journalled in said bed plate, eccentric bars connecting the table to the studs, said studs when rotated being adapted to swing the table in a circular path around the peripheries of the spindle cutters, a gear attached to one of said studs, a driving means cooperating with said gear, means for tilting the bed plate and table in unison to a predetermined angle, and means for stopping rotation of the driving means simultaneously with the tilting of the table and bed plate.

3. A tenon forming machine comprising a base, an upper and lower surface on said base, a pair of spindles mounted mutually parallel on the upper surface, cutters fixed to the ends of said spindles, said spindles and cutters being horizontally aligned, a table mounted adjacent said cutters, means for moving said table in a circular path around said cutters comprising eccentric bars, studs supporting said eccentric bars and rigid with the latter, a bed table supporting said studs, a gear fixed to one of said studs, driving means for rotating said gear, a toothed hub on said driving means, a cooperating member on a support shaft engaging the toothed hub to rotate the driving means, and means for disengaging the toothed hub from its cooperating means, and means for tilting said table from a horizontal operative to an angular inoperative position.

4. A tenon forming machine comprising a base, an upper and lower surface on said base, a pair of spindles mounted mutually parallel on the upper surface, cutters fixed to the ends of said spindles, said spindles and cutters being horizontally aligned, a table mounted adjacent said cutters, means for moving said table in a circular path around said cutters comprising eccentric bars, studs supporting said eccentric bars and rigid with the latter, a bed table supporting said studs, a gear fixed to one of said studs, driving means for rotating said gear, a toothed hub on said driving means, a cooperating means on a support shaft engaging the toothed hub to rotate the driving means, means for disengaging the toothed hub from its cooperating means, and additional means for stopping rotation of the driving means simultaneously with the tilting of the table and bed plate.

5. A tenon forming machine comprising a base, an upper and lower surface on said base, a pair of spindles mounted mutually parallel on the upper surface, cutters fixed to the ends of said spindles, said spindles and cutters being horizontally aligned, a table mounted adjacent said cutters, means for moving said table in a circular path around said cutters comprising eccentric bars, studs supporting said eccentric bars and rigid with the latter, a bed table supporting said studs, a gear fixed to one of said studs, driving means for rotating said gear, a toothed hub on said driving means, a cooperating member on a support shaft engaging the toothed hub to rotate the driving means, a belt driven shaft actuating a fixed driving shaft, a vertical guide frame supporting said bed plate and table, and means for adjusting said bed plate in a vertical plane to vary the distance between the surface of the table and the axes of the cutters.

In testimony whereof I affix my signature.

FRED SCHLATTERER.